United States Patent
Hanechak et al.

(10) Patent No.: US 8,502,834 B2
(45) Date of Patent: Aug. 6, 2013

(54) REPRESENTING A PRINTED PRODUCT USING PIXEL OPACITY AND COLOR MODIFICATION

(75) Inventors: Brian D. Hanechak, Waltham, MA (US); Paul J. Shelman, Lincoln, MA (US)

(73) Assignee: Vistaprint Technologies Limited, Hamilton (BM)

( * ) Notice: Subject to any disclaimer, the term of this patent is extended or adjusted under 35 U.S.C. 154(b) by 779 days.

(21) Appl. No.: 12/493,999

(22) Filed: Jun. 29, 2009

(65) Prior Publication Data

US 2010/0328335 A1 Dec. 30, 2010

(51) Int. Cl.
| | |
|---|---|
| *G09G 5/00* | (2006.01) |
| *G09G 5/02* | (2006.01) |
| *H04N 5/445* | (2011.01) |
| *H04N 9/64* | (2006.01) |
| *H04N 1/46* | (2006.01) |
| *G06F 15/00* | (2006.01) |
| *G06K 15/00* | (2006.01) |
| *G06K 9/00* | (2006.01) |
| *G06K 9/40* | (2006.01) |
| *G06K 9/36* | (2006.01) |

(52) U.S. Cl.
USPC ........... 345/592; 345/581; 345/589; 345/586; 345/606; 345/643; 348/563; 348/571; 348/552; 358/1.1; 358/1.9; 358/2.1; 358/517; 358/525; 382/163; 382/167; 382/254; 382/274; 382/276

(58) Field of Classification Search
USPC ............... 348/584–587, 53–569; 358/1.1, 358/1.9, 2.1, 3.01, 3.21, 501, 516–517, 518, 358/525; 345/418, 428, 581, 586, 592–594, 345/606, 618–620, 629–630, 643, 683, 345/589–591, 600; 382/162–163, 167, 254
See application file for complete search history.

(56) References Cited

U.S. PATENT DOCUMENTS

| | | | |
|---|---|---|---|
| 6,130,961 A | 10/2000 | Akioka et al. | |
| 2001/0014174 A1 | 8/2001 | Yamamoto | |

(Continued)

FOREIGN PATENT DOCUMENTS

| | | |
|---|---|---|
| EP | 1531616 | 5/2005 |
| WO | WO2008-128242 | 10/2008 |

OTHER PUBLICATIONS

Kansei, Iwata et al: "Computer Simulation of Printed Colors on Textile Materials", Proceedings of the International Society for Optical Engineering (SPIE, SPIE, USA, vol. 2171, Feb. 7, 1994, XP-007905044.

*Primary Examiner* — Wesner Sajous
(74) *Attorney, Agent, or Firm* — Jessica Costa (57) ABSTRACT

An original design image is processed to create a modified design image for blending with an image of a product to create a combined image representing the result of printing the design image onto the product. To create a modified design image, both the alpha value and color of pixels in the original design image are modified. The modified alpha value and the modified color of a pixel are determined as a function of the amount of gray in the original color of the pixel. The modified pixel color is calculated by subtracting the level of gray in the original pixel color from each of the three original component color values and increasing any remaining color component values as a function of the modified alpha value of the pixel.

16 Claims, 6 Drawing Sheets

U.S. PATENT DOCUMENTS

| | | | |
|---|---|---|---|
| 2002/0071604 A1* | 6/2002 | Orpaz et al. | 382/162 |
| 2004/0004626 A1 | 1/2004 | Ida et al. | |
| 2005/0203724 A1* | 9/2005 | Orpaz et al. | 703/6 |
| 2006/0044323 A1 | 3/2006 | Ameline et al. | |
| 2006/0187235 A1* | 8/2006 | Hamburg | 345/592 |
| 2008/0317388 A1* | 12/2008 | Hamburg | 382/311 |

* cited by examiner

REPRESENTING A PRINTED PRODUCT USING PIXEL OPACITY AND COLOR MODIFICATION

FIELD OF THE INVENTION

This invention relates to image processing and, more particularly, to the creation of images depicting products having printed design elements.

BACKGROUND OF THE INVENTION

Printing services Web sites allowing a user to access the site from a computer located at the user's home or work and design and purchase an item of apparel, such as a t-shirt or other item, are well known and widely used by many consumers and businesses. Typically, these printing services sites allow the user to first review uncustomized images of the various products that are available from the provider. When the user selects a specific product to customize, the sites typically provide online tools allowing the user to provide the text that the user desires to appear on the customized product. The user is also typically allowed to either upload a full color image from the user's computer to be incorporated into the product design or select from a number of decorative designs, images, and other graphic elements that are provided for the user's use by the printing services provider. Images of the user text entries and the user-selected decorative elements, collectively referred to herein as "design images" are combined with the basic product image to create a composite image indicating the appearance of the printed product. When the design is completed to the user's satisfaction, the user can place an order through the site for production of a desired quantity of the corresponding printed product using a commercially available computer-to-textile printing system.

To avoid customer disappointment, it is desirable that the image of the product that is displayed to the customer on the customer's computer display be a substantially accurate representation of the physical product that the user will later receive. Trying to faithfully represent the appearance of printed areas can be a problem because the appearance of the printed image may be affected by the color of the surface on which the image is printed. In the field of printing designs onto apparel, some printing systems are particularly adapted to print designs on dark materials. These systems typically first print a layer of white ink and then print the design on top of the white ink layer. This process results in a faithful color reproduction of the design, but such systems are typically more expensive to purchase and operate. The system itself contains additional white ink printing components, additional white ink is required, the printing process is slower because of the extra printing steps, and the drying time is longer because of the additional ink that is applied.

Other printing systems are particularly adapted to print designs on very light materials. These systems typically use only color inks, with any white areas in the design being treated as transparent. Because no ink is applied in the white areas of the design, the underlying material is visible. This type of system is typically less expensive to buy and operate than the dark material printing system, is capable of producing more units over the same period of time, and requires less product drying time. When this type of printing system is used to print a design onto white material, the customer receives a printed product that is generally substantially similar to the image displayed to the user on the user's computer system at the time the product was being ordered. However, if this type of printing system is used to print a design onto a material that is gray or another non-white color, the color of the material often affects the appearance of the design on the material, especially in areas of the printed design that are printed in lighter colors. For example, an image having areas of lighter colors that is printed on a white t-shirt will not have the same appearance as the same image printed on a gray t-shirt.

To minimize the risk of customer surprise and disappointment when the printed product is delivered, it is desirable that the customer be shown an image of the product during the product design and ordering process that is as accurate a depiction of the physical product as practical. A technique for design image processing involving only the modification of the alpha values of design image pixels is disclosed in co-pending and co-assigned application Ser. No. 11/735,838 filed Apr. 16, 2007 and entitled "Representing a Printed Product Using Image Blending".

SUMMARY

The present invention is directed at automated systems and methods for generating images of products for displaying on a user's computer display in a manner that indicates the appearance of text and design elements that will be printed on the product.

In accordance with one embodiment of the invention, before a design image is blended with a product image, pixels in the design image are modified such that both the alpha values associated with the pixels and the colors of the pixels are changed.

It is an advantage of the invention that a user is presented with a product image that indicates the actual effect of printing a design image having relatively light areas on a non-white product.

These and other objects, features and advantages of the invention will be better understood with reference to the accompanying drawings, description and claims.

DETAILED DESCRIPTION

It will be understood that, while the discussion herein describes an embodiment of the invention in the field of preparation of customized printed t-shirt, it will be understood that the invention is not so limited and is relevant to any application for displaying an image intended to depict the actual appearance of a product after the product has been printed.

Figure 1:
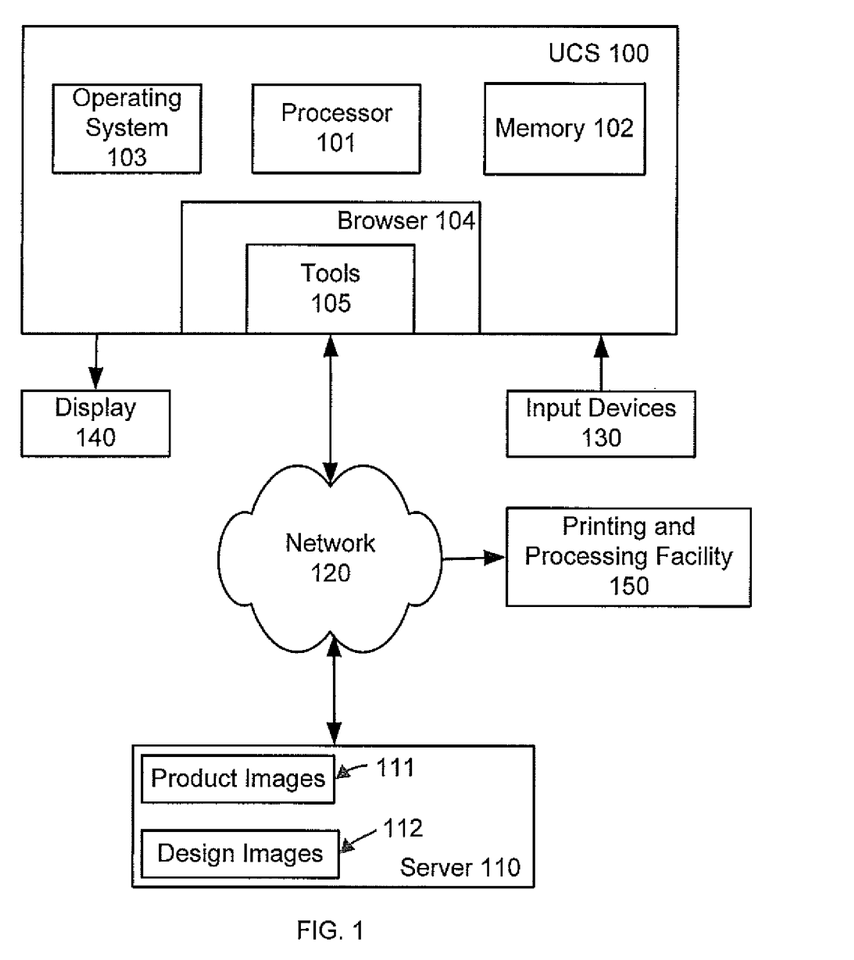
FIG. 1 shows an illustrative system with which the invention may be employed.

FIG. 1 depicts one illustrative system with which the invention may be employed. User computer system UCS 100 includes processor 101 and memory 102. Memory 102 represents all UCS 100 components, computer readable media, and subsystems that provide data storage for UCS 100, such as RAM, ROM, and internal and external hard drives. In addition to providing permanent storage for all programs installed on UCS 100, memory 102 also provides temporary storage required by the operating system and any application program that may be executing. In the embodiment described herein, UCS 100 is a typically equipped personal computer, but UCS 100 could also be any other suitable device for interacting with server 110, such as a portable computer, a tablet computer, or a computer system particularly adapted or provided for electronic product design, such as a product design kiosk, workstation or terminal. The user views images from UCS 100 on display 140, such as a CRT or LCD screen, and provides inputs to UCS 100 via input devices 110, such as a keyboard and a mouse.

When UCS 100 is operating, an instance of the USC 100 operating system, for example a version of the Microsoft Windows operating system, will be running, represented in FIG. 1 by operating system 103. In FIG. 1, UCS 100 is running a Web browser 104, such as, for example, Internet Explorer from Microsoft Corporation. In the depicted embodiment, Tools 105 represents product design and ordering programs and tools downloaded to UCS 100 via Network 120 from remote Server 110, such as downloadable product design and ordering tools provided by Vistaprint Limited and publicly available at Vistaprint.com. Tools 105 runs in browser 104 and exchanges information and instructions with Server 110 during a design session to support the user's preparation of a customized product. When the customer is satisfied with the design of the product, the design can be uploaded to Server 110 for storage and subsequent production of the desired quantity of the physical product on appropriate printing and post-print processing systems at printing and processing facility 150. Facility 150 could be owned and operated by the operator of Server 110 or could be owned and operated by another party.

While Server 110 is shown in FIG. 1 as a single block, it will be understood that Server 110 could be multiple servers configured to communicate and operate cooperatively to support Web site operations. Server 110 will typically be interacting with many user computer systems, such as UCS 100, simultaneously. Server 110 includes the components, subsystems and computer readable media that provide server data storage, such as RAM, ROM, and disk drives or arrays having stored thereon the various computer programs, product layouts, designs, colors, fonts, and other information to enable the creation and rendering of electronic product designs.

In the embodiment discussed herein, server 110 includes a number of stored images of various products, such as photographic images of various shirts and other items available for customization and purchase, collectively depicted in FIG. 1 as product images 111. Server 110 also retains a plurality of images and graphic elements that are available for the user to select and add to the user's shirt design for customization purposes. Tools 105 allow the use to enter one or more strings of text for incorporation into the design. The user's text information is transferred by tools 105 from UCS 100 to server 110 and server 110 creates a corresponding image of the appropriate size for displaying to the user. These user text images and the decorative images and graphics are collectively indicated in FIG. 1 as design images 112. While shown in FIG. 1 as two blocks, it will be understood that product images 111 and design images 112 could be stored in a single memory device or distributed across multiple memory devices.

In interacting with server 110 to create a custom product design, the user is typically presented with one or more screen displays (not shown) allowing the user to select a type of product for customization and then review thumbnail images of various design images prepared by the site operator and made available for incorporation into the product design by the user. To provide the customer with a wide range of design choices, each design image may comprise a combination of graphics, images, color schemes, and/or other design elements. The service provider has also pre-selected one or more default fonts to be used to render any text entered by the user. When a product and a design image have been selected by the user for customization, an initial product design page is downloaded from server 120 to UCS 100.

Figure 2:
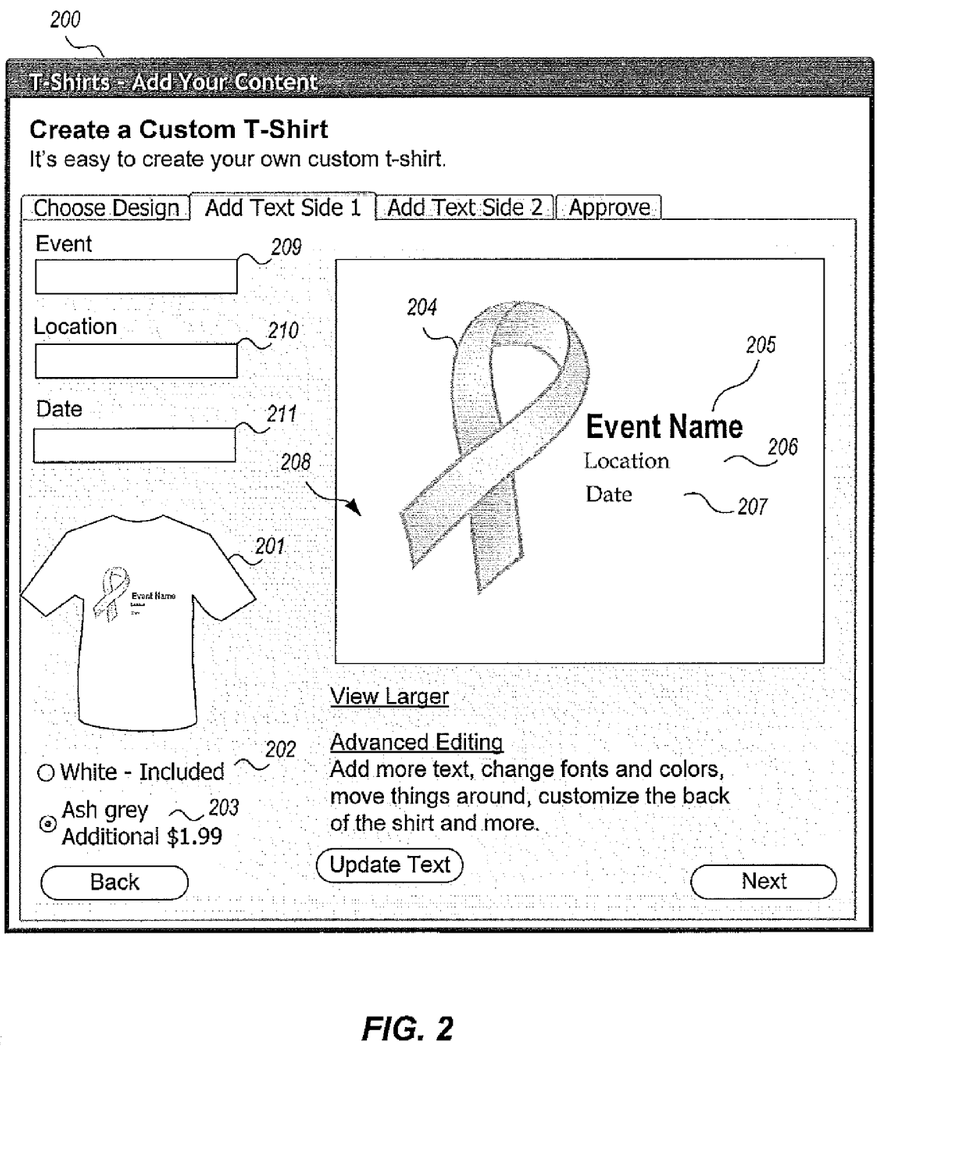
FIG. 2 shows an illustrative product design display.

FIG. 2 depicts an illustrative embodiment of product design page 200. Product image 201 depicts the selected product in combination with the design image and indicates the appearance of the finished printed product. In FIG. 2, product image 201 is an image of a white t-shirt, corresponding to the color selection indicated by radio button 202. Radio button 203 is provided to allow the user to select a gray shirt, if desired. Additional radio buttons, or other known selection mechanisms, for additional color choices could be employed, if desired.

In this example, the design that will be printed on the shirt is the combination of ribbon image 204 and three pre-defined text images 205-207 displayed on white background 208. With a printing system that is not adapted to print the color white, the white background 208 is not printed, therefore the underlying surface in those areas will be visible. In the depicted example, the service provider has initially provided default text images 205-207 with the placeholder text "Event Name", "Location" and "Date" to give the user an indication of the relative size and location of where and how the user's text entries will appear.

Text entry fields 209-211 are provided to allow the user to enter whatever characters the user desires to appear on the shirt in the areas 205-207. The characters entered by the user could include letters, numbers, punctuation marks or other symbols as supported by the site operator. All characters of all types entered by the user are collectively referred to herein as "text". Images corresponding to the user's text are created at server 110, returned to UCS 100 and rendered by tools 105 at the appropriate locations 205-207 relative to ribbon 204.

In this illustrative example, ribbon 204 is of a relatively light color, for example, yellow or pink. Further, ribbon 204 is not of a single uniform color, but has relatively lighter and darker areas that simulate the effects of light on the ribbon surface. Because of the relatively light colors used for much of the design, the ink applied by the printing system in those areas will not completely obscure the material of a non-white shirt. After printing, the non-white shirt material will be perceptible underneath the printed areas and the printed design will not appear exactly as when displayed against a white background. The degree to which the shirt material will be detectable is related to the relative brightness of the colors in the design. Darker colored areas of the design will more effectively obscure the underlying surface than brighter colors. User text entries printed on the shirt would be affected in the same manner.

Figure 3:
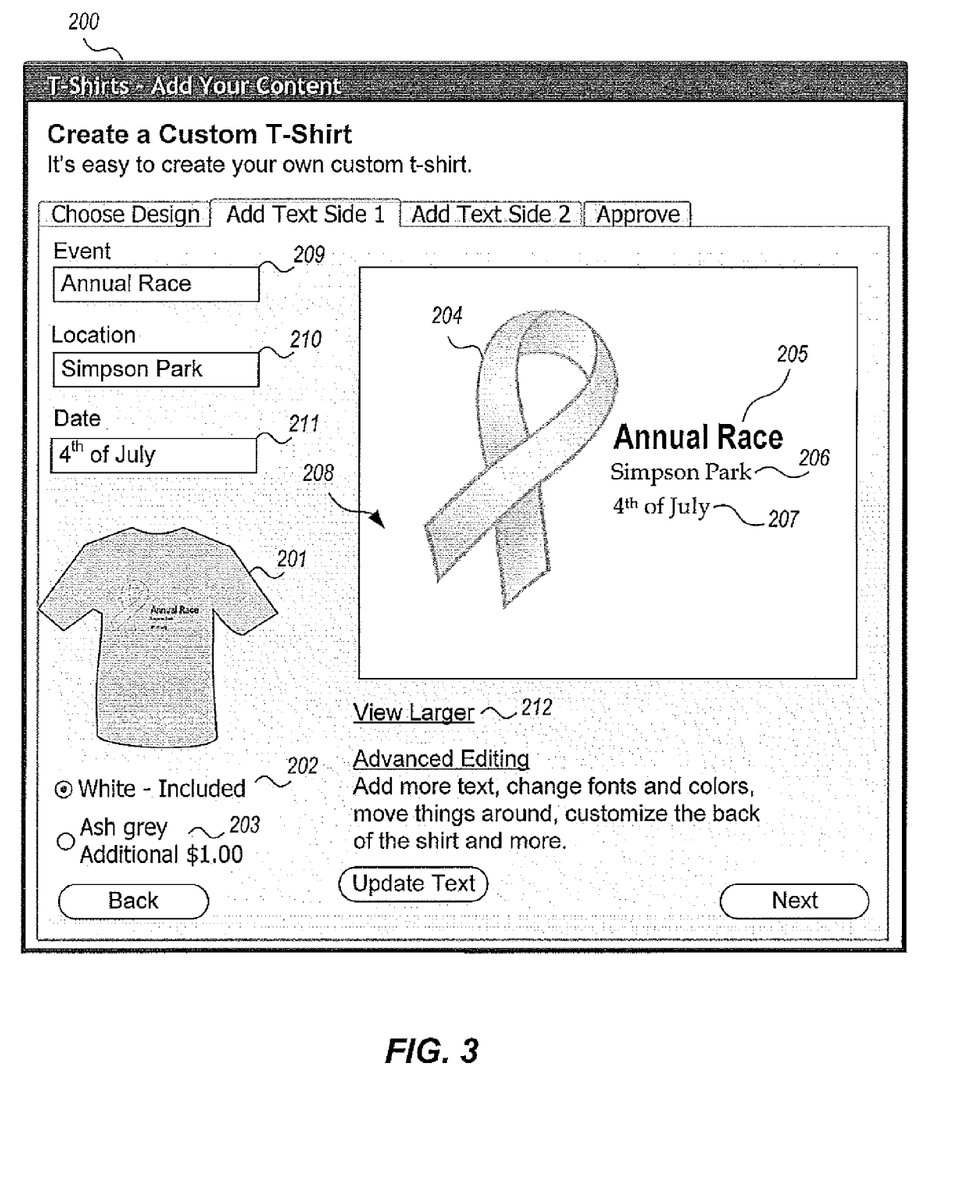
FIG. 3 shows the product display after user customization.

FIG. 3 illustrates the status of product design page 200 after the design image has been updated to reflect user text entries in text fields 209-211 and the user's selection of a gray shirt using radio button 203 instead of the white shirt initially displayed. Product image 201 has been updated to incorporate the user's text entries and to indicate the gray shirt color chosen by the user. Because of the relatively small size of product image 201, "view larger" link 212 is provided to allow the user to request the displaying of a larger image of the current design.

Figure 4:
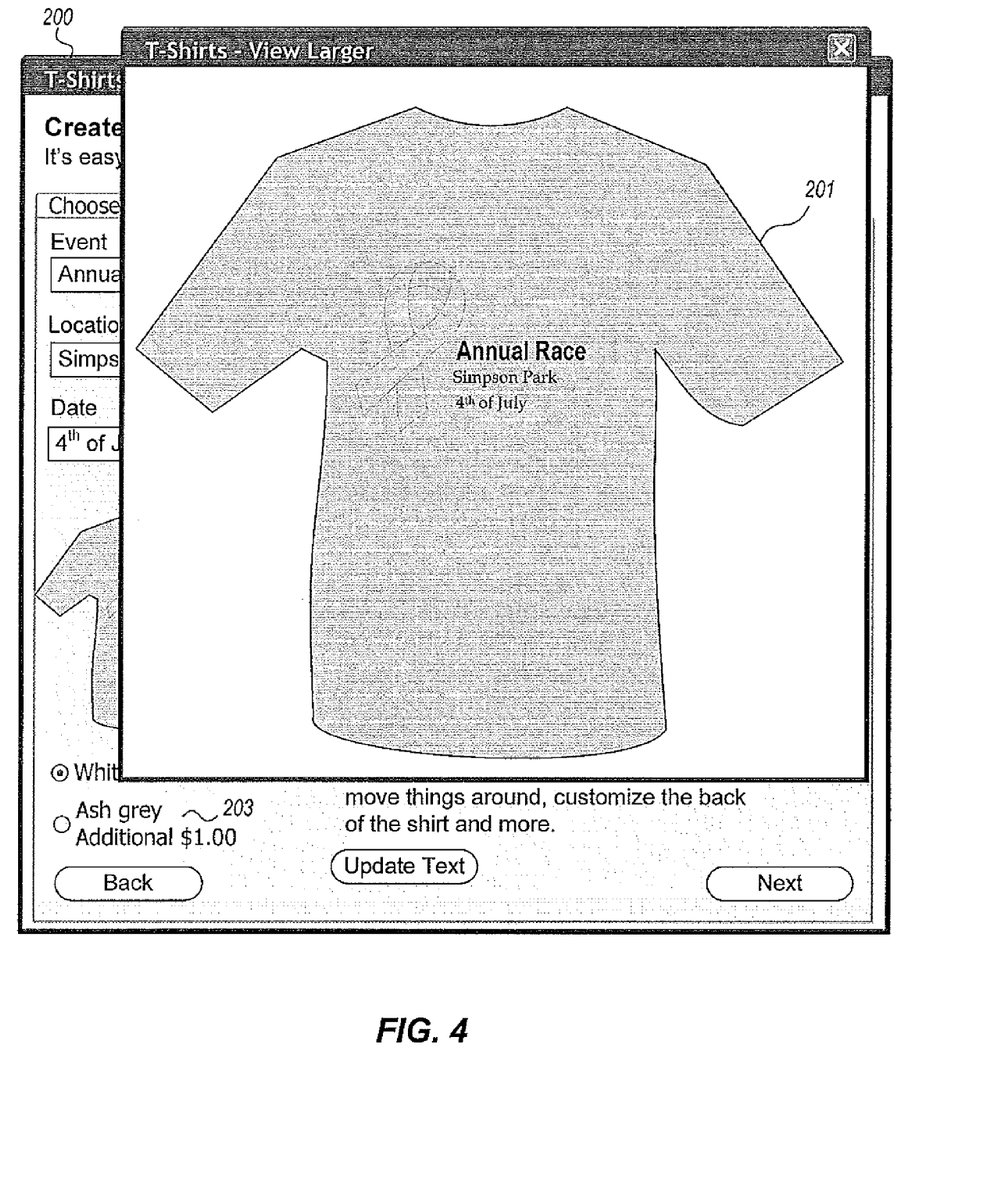
FIG. 4 shows an image of the customized product.

FIG. 4 depicts a larger version of product image 201 that is displayed to the user in response to the selection of link 212. As indicated by the image in FIG. 4, the ribbon in product image 201 does not appear exactly the same as ribbon 204 in FIGS. 2 and 3. Product image 201 has been created by blending the design image with the underlying shirt image to create a composite product image that illustrates to the customer the actual appearance of the printed product.

As is well known and understood in the art, color images displayed on computer monitors are comprised of many individual pixels with the displayed color of each individual pixel being the result of the combination of the three component colors red, green and blue. In the illustrative embodiment discussed below, each of the three component colors of a pixel is controllable independently of the other component colors and can have any one of 256 possible values from 0 to 255. In such a display system, over 16 million ($256^3$) possible combinations of red, green and blue values are available for each pixel.

In addition, each pixel has an associated parameter, referred to as the alpha value, which controls the "opacity" of the pixel during image blending operations. Modern graphic rendering programs, such as the .NET rendering engine from Microsoft, are typically adapted to perform linear pixel blending transformations. When one image is positioned over another image, the alpha value of the top pixel determines the extent to which the bottom pixel contributes to the composite blended image. A pixel alpha value equal to 1 indicates that the pixel is completely opaque and will completely replace or obscure the underlying pixel. An alpha value equal to 0 indicates that the top pixel is completely transparent and the underlying pixel is, therefore, completely visible.

If the alpha value of the top pixel is an intermediate value between 0 and 1, a blended composite pixel will result that is a combination of the top and bottom pixel. The relative amount to which each of the two pixels contribute to the blended pixel is controlled by the alpha value of the top pixel. In the embodiment described herein, all pixels in the design images retained in design images 112 have an initial alpha value of 1, but it will be understood that this is not essential and other initial alpha values could be employed.

As will be discussed below, the pixels of the original design image are processed to calculate modified pixel alpha values and modified pixel colors. When the modified design image with modified alpha and color values is combined with a product image, the resulting blended composite image is a more accurate depiction of the appearance of the printed physical product.

Figure 5:
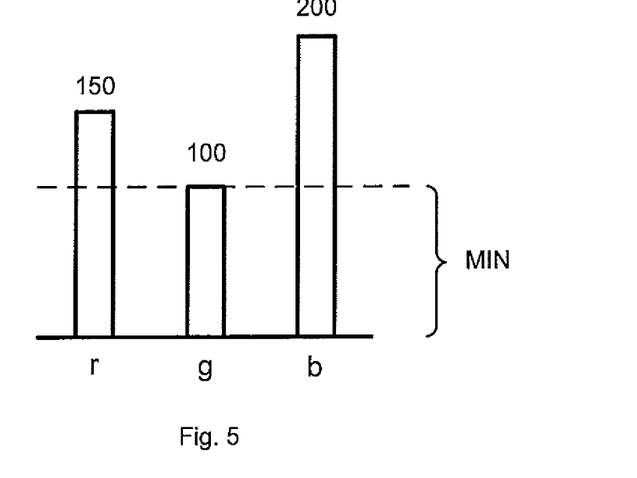
FIG. 5 illustrates the original component colors in a representative pixel.

FIG. 5 depicts a pixel having a red (r) value of 150, a green (g) value of 100 and a blue (b) value of 200. These component color values have no particular significance and were chosen simply for illustration. For each pixel in the original design image, the lowest value among the three component color of that pixel establishes a value for that pixel referred to herein as MIN. In this pixel example, the lowest value of the three component colors is the component color green, which has a value of 100 on a scale of 0 to 255, therefore MIN equals 100 for this pixel.

If the three component color values of a pixel were all zero, the pixel would be fully black. In that case, the value of MIN would be zero and the value of alpha would be 1, i.e. fully opaque. If the three component color values of a pixel were all 255, the pixel would be fully white. In that case, the value of MIN would be 255 and the value of alpha would be 0, i.e., fully transparent. If the values of three component colors of a pixel are all equal at an intermediate value between 0 and 255, the resulting pixel color would be a gray, with the particular shade of gray determined by the component color level. If a pixel has three non-zero and unequal color component levels, the color of the pixel can be considered to be a combination of gray, as determined by the value of MIN for the pixel, plus additional components to the extent one or more color components exceed the MIN value. Referring again to the pixel example in FIG. 5, the illustrated pixel can be viewed as having a gray component (being the shade of gray produced by r, g and b having an equal value of 100) plus additional red and blue components.

In the embodiment discussed herein, to create a modified pixel color for image blending, the gray portion of the current pixel color is removed by subtracting the value of MIN from each of the three component colors, such that at least one of the component color values will have a modified value of zero, and increasing the levels of the remaining non-zero component colors. If two of the three component colors of a pixel happened to both be at the MIN level, only one non-zero component color would be remaining. In the example in FIG. 5 subtracting the MIN value of 100 from each of the three component colors yields a red value of 50, a green value of 0 and a blue value of 100. The value of the remaining non-zero color components are then increased in value, as discussed below, to arrive at the final modified color components of the pixel.

For most pixels, in addition to the reduction of the values of the component colors of the pixel (thereby making the pixel darker), the alpha value of the pixel will be reduced (thereby increasing the transparency of the pixel). Looking first at modification of the alpha value, for each pixel in the design image a modified alpha (MA) value for that pixel is calculated based on the value of MIN and the original alpha (OA) of the pixel as follows:

$$MA=OA*((1-(MIN/255))$$

It will be understood that alternate calculations, yielding substantially similar results, such as $MA=OA*(1-((MIN+1)/256))$, could be used if found to be more efficient on the particular computer system being employed to perform the calculations. As mentioned above, in the described embodiment, the original alpha value OA of all design image pixels is typically set as 1.

The values of MN, MA, OA and the original r, g, and b component colors values of the pixel are then used to calculate modified values for the red, blue and green color components of the pixel (the modified color values of the pixel are referred to herein as R, G and B respectively) as follows:

$$R=((r-MIN)*OA)/MA$$

$$G=((g-MIN)*OA)/MA$$

$$B=((b-MIN)*OA)/MA$$

The results of these calculations are rounded or, if desired, truncated to determine the modified color level.

As indicated by the above equations, if a pixel happens to have any component color with an original value of 0, and therefore a MIN value of 0, the alpha value of that pixel and the values of the non-zero color components will remain unchanged from their original values. If a pixel happens to be fully white with all three component colors having an original value of 255, the MA for that pixel will be zero and the calculations for R, G and B are not performed.

Figure 6:
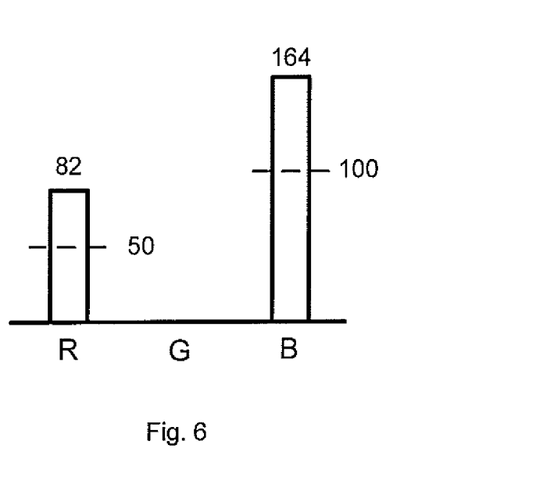
FIG. 6 illustrates the component colors in the pixel of FIG. 5 after modification.

Performing the above calculations on the example pixel component color values depicted in FIG. 5 would yield an MA of 0.61 (rounded to two decimal places) and, as depicted in FIG. 6, a modified pixel color having R, G and B values of 82, 0, and 164 respectively. As shown in FIG. 6, the remaining values of the red and blue components of the original pixel color that exceeded the MIN value of 100 (values of 50 for red and 100 for blue in this example) have been increased by dividing these remaining values by the modified alpha value for that pixel The value of the green component of the pixel in FIG. 5 was the MIN value for that pixel and, therefore, the green component of the modified pixel correspondingly has a value of zero.

Figure 7:
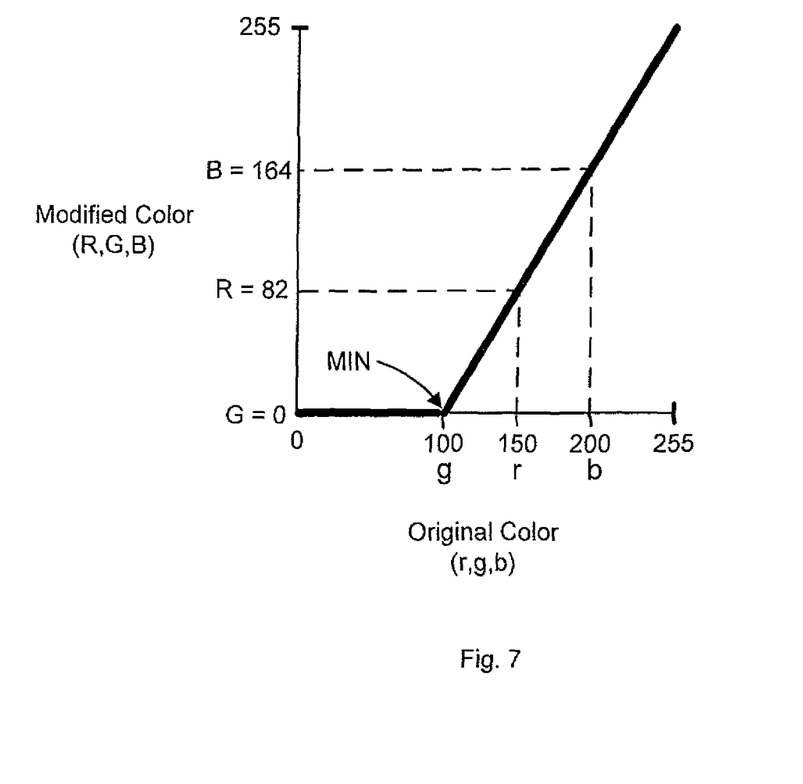
FIG. 7 is graphical representation of the relationship between the original and modified pixel colors of FIGS. 5 and 6.

Another illustration of the relationship between the original and modified component colors of the pixel is shown in FIG. 7. The three original component color values of the pixel are found along the horizontal axis and the corresponding modified pixel color values are found along the vertical axis.

It will be understood that the functions described herein are merely representative. The embodiment described above has been designed to take advantage of the standard linear transform operations that are typically supported by commercially available blending programs and that can be performed relatively rapidly with minimal computational overhead. As an alternative, if the rapid computation of blending results is not a critical factor, custom blending code with greater processing overhead could be developed to vary alpha and component color values according to a more complex computational function.

While an exemplary embodiment of the invention has been discussed, the described embodiment is to be considered as illustrative rather than restrictive. For example, in the above described embodiment, the pixel modification calculations are performed using the red, green, and blue pixel component colors used by display system 140. This embodiment does not involve any conversion of the images into another color space and facilitates rapid handling of image blending operations in a high-volume processing environment, such as a printing services web site that may have multiple active product design session underway at any given time. If the additional processing overhead associated with conversion between color systems is not an issue, alternate embodiments could be employed. For example, the pixel modification process and blending could have been performed based on a product image and a design image in the color space employed by the product printing system used at printing and processing facility 150, for example using image pixel colors expressed in terms of printing system component ink colors, e.g., cyan, magenta and yellow). The scope of the invention is as indicated in the following claims and all equivalent methods and systems.

What is claimed is:

1. A computer-implemented method for combining a digital product image with a digital design image to create a blended digital image indicating the appearance of the product after the digital design image has been printed on the product, the method comprising the steps of:
    creating, by one or more processors, a modified design image by, for each pixel of at least a portion of the pixels in the design image, (a) reducing an alpha value associated with the pixel and (b) modifying a color of the pixel by determining a lowest component color value among component colors of the pixel, subtracting the lowest component color value from each component color value of the pixel, and dividing the result of the subtraction step for each component color by the reduced alpha value of the pixel to determine modified component color values for the pixel, and
    generating, by one or more processors, a blended digital image by combining the modified design image with the digital image of the product.

2. The method of claim 1 wherein the step of reducing the alpha value associated with the pixel comprises reducing the alpha value in proportion to the value of the lowest component color value among the component colors of the pixel.

3. The method of claim 1 wherein the step of modifying the color of the pixel comprises reducing the original value of at least one of the component colors.

4. The method of claim 3 wherein the one or more component colors having the lowest original value are reduced to have a modified component color value of zero.

5. The method of claim 1 further comprising transmitting, by one or more processors, the blended image to a remote computer system for display.

6. A method for processing the pixels of an original digital image to create a modified digital image, the method comprising the steps of:
    for each pixel in the original image, determining by one or more processors an alpha value associated with the pixel and values of component colors of the pixel, and
    if each component color of the pixel has a value greater than zero and if at least one of the component colors of the pixel is less than the maximum possible value for that component color, reducing by one or more processors the alpha value of the pixel and modifying by one or more processors the color of the pixel by determining the lowest component color value among the component colors of the pixel, subtracting the lowest component color value from each component color value of the pixel, and dividing the result of the subtraction step for each component color by the reduced alpha value for the pixel to set modified component color values for the pixel.

7. The method of claim 6 wherein the step of reducing the alpha value associated with the pixel comprises reducing the alpha value in proportion to the value of the lowest component color value among the component colors of the pixel.

8. The method of claim 6 further comprising blending by one or more processors the modified digital image with a second image to create a blended digital image.

9. An apparatus for combining a digital product image with a digital design image to create a blended digital image indicating the appearance of the product after the digital design image has been printed on the product, comprising:
    one or more processors configured to create a modified design image by, for each pixel of at least a portion of the pixels in the design image, (a) reducing an alpha value associated with the pixel and (b) modifying a color of the pixel by determining a lowest component color value among component colors of the pixel, subtracting the lowest component color value from each component color value of the pixel, and dividing the result of the subtraction step for each component color by the reduced alpha value of the pixel to determine modified component color values for the pixel, and
    one or more processors configured to generate a blended digital image by combining the modified design image with the digital image of the product.

10. The apparatus of claim 9, wherein the alpha value of a pixel is modified such that the reduced alpha value is reduced in proportion to the value of the lowest component color value among the component colors of the pixel.

11. The apparatus of claim 9 wherein the one or more processors are configured to modify a pixel color by reducing the original value of at least one of the component colors.

12. The apparatus of claim 11 wherein the one or more component colors having the lowest original value are reduced to have a modified component color value of zero.

13. The apparatus of claim 9 further comprising a computer display displaying the blended image.

14. An apparatus for processing the pixels of an original digital image to create a modified digital image, comprising
one or more processors configured to determine, for each pixel in the original image, an alpha value associated with the pixel and values of component colors of the pixel, and
one or more processors configured to, if each component color of the pixel has a value greater than zero and if at least one of the component colors of the pixel is less than the maximum possible value for that component color, reduce the alpha value of the pixel and modify the color of the pixel by determining the lowest component color value among the component colors of the pixel, subtracting the lowest component color value from each component color value of the pixel, and dividing the result of the subtraction step for each component color by the reduced alpha value for the pixel to set modified component color values for the pixel.

15. The apparatus of claim 14 wherein the alpha value of a pixel is reduced such that the reduced alpha value is reduced in proportion to the value of the lowest component color value among the component colors of the pixel.

16. The apparatus of claim 14, wherein the one or more processors are further configured to blend the modified digital image with a second image to create a blended digital image.

* * * * *